J. R. KEY.
STEERING MECHANISM FOR ROAD GRADERS.
APPLICATION FILED AUG. 14, 1919.
1,370,973.
Patented Mar. 8, 1921.
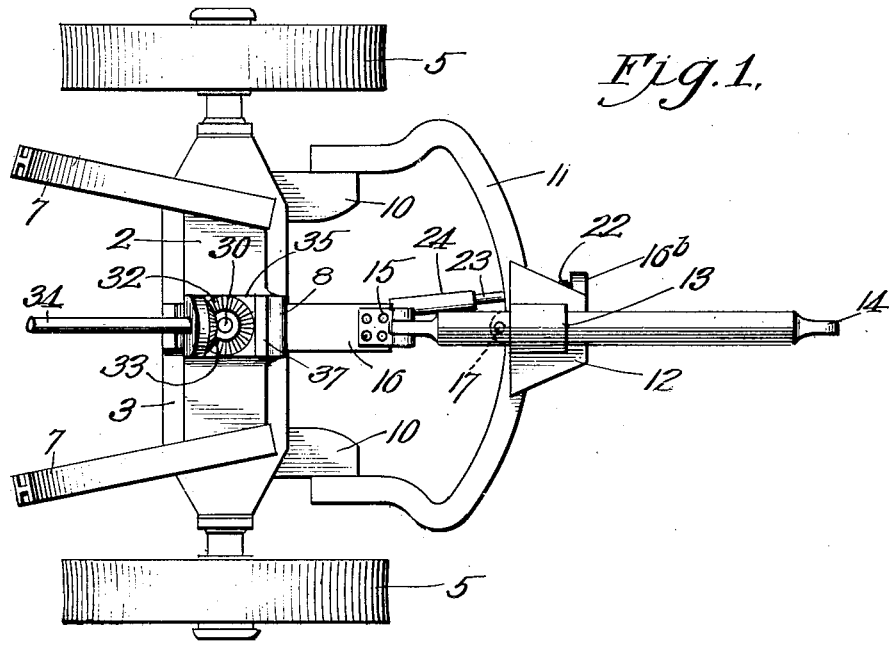
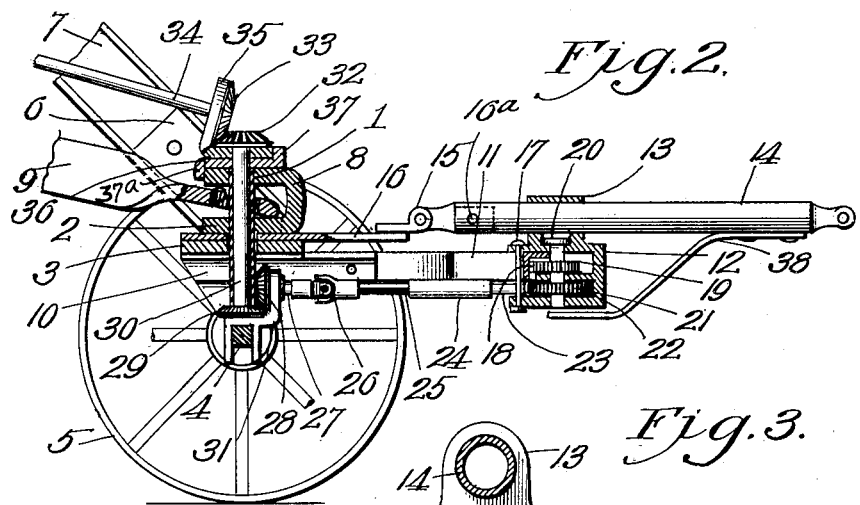
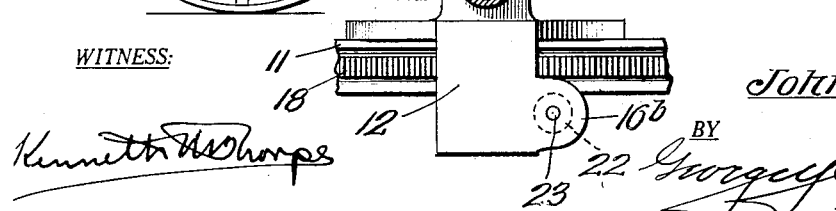
WITNESS:
INVENTOR.
John R. Key
BY
George Thorpe
ATTORNEY.

UNITED STATES PATENT OFFICE.

JOHN R. KEY, OF LEAVENWORTH, KANSAS.

STEERING MECHANISM FOR ROAD-GRADERS.

1,370,973. Specification of Letters Patent. Patented Mar. 8, 1921.

Application filed August 14, 1919. Serial No. 317,441.

*To all whom it may concern:*

Be it known that I, JOHN R. KEY, a citizen of the United States, residing at Leavenworth, in the county of Leavenworth and State of Kansas, have invented certain new and useful Improvements in Steering Mechanism for Road-Graders, of which the following is a specification.

This invention relates to road grading machines and more especially to steering mechanism therefor, my object being to produce an efficient steering mechanism which is operable by the person in control seated at the rear end of the machine. A further object is to produce a steering construction which accommodates the necessary movements of the tongue and of the front truck, and which embodies a breakable pin for permitting the tongue to be pulled out of the machine without injury to the steering mechanism in the event the opposition to the travel of the machine becomes so great as to threaten injury to the machine.

With these general objects in view the invention consists in certain novel and peculiar features of construction and organization of parts as hereinafter described and claimed; and in order that it may be fully understood reference is to be had to the accompanying drawing, in which:

Figure 1, is a top plan view of the front end of a grading machine embodying the invention.

Fig. 2, is a central vertical section of the same.

Fig. 3, is an enlarged front view of a part of the steering mechanism.

In the said drawing, 1 indicates a tubular king bolt journaled in a plate 2 forming the upper part of the front truck and extending loosely through an underlying transverse arch 3 forming the top of the lower part of said truck. Underlying the king bolt and secured in the customary manner to the ends of the arch 3 is the axle 4 equipped with the usual ground wheels 5. The plate 2 is provided at its ends with upwardly and rearwardly projecting arms 6 riveted or bolted to the front ends of the frame bars 7 of the machine. The plate 2 is also provided with a central right angle shaped extension 8 through which the tubular king bolt also extends, and said extension forms a chamber receiving the front end of the draft bar 9 extending from the scraper-blade-carrying circle frame, not shown, of the machine, the said end of said draft bar pivotally engaging said king bolt so as not to interfere with the rocking movements of the axle incident to the wheels traveling over ground at different levels, though the particular construction of the truck *per se*, is unimportant in this connection except in respect to the use of a means for transmitting power coaxially with the king bolt, for steering purposes.

Secured to and projecting forwardly from the arched plate 3 at opposite sides and equal distances from the king bolt is a pair of angle shaped bars 10 and pivoted thereto for up and down movement is the yoke 11 slidingly supporting a frame 12 provided at its uper side with a sleeve 13 through which extends a tongue 14, pivoted for up and down movement to a plate 15 secured rigidly to a draft plate 16 pivoted on the king bolt between plates 2 and 3. The tongue is preferably made in sections fastened together by a breakable pin 16$^a$ to permit the front portion of the tongue to slide forwardly out of the sleeve under the pull of a traction engine or other power upon the breaking of said pin. A bolt 17 extends through and forms a closure for the casting 12 within the yoke 11 to guard against accidental dislocation of said casting and to assist in retaining the casting in operative relation to said yoke, which bolt under certain conditions may also break to avoid injury to the steering mechanism, as hereinafter explained. The yoke is provided on its front or outer face with a rack bar 18 meshing with a cog wheel 19 secured on a short vertical shaft 20 journaled in the casting, and also secured on said shaft is a worm wheel 21 engaging a worm 22 on a shaft section 23 provided with a rigid tubular or sleeve portion 24 telescopically and non-rotatably engaging an angular shaft section 25 universally coupled as at 26 to a short shaft section 27. The shaft section 27 is provided with a bevel gear 28 meshing with a bevel gear 29 rigidly secured on a vertical shaft 30 extending through the tubular king bolt and journaled at its lower end on an angle bracket 31 slidably engaging the axle 4 to avoid disturbing the relation between bevel gears 28 and 29 when the axle rocks vertically through the passage of the front carrying wheels over rough or uneven ground. The said angle bracket also forms a journal for the shaft section 27, it being noted that the front end of the shaft composed of the sections 23, 25 and 27, is journaled in an ear 16ᵇ of the casting 12.

The upper end of the vertical shaft 30 is equipped with a bevel gear 32 meshing with a bevel gear 33 on the front end of a steering shaft 34 controllable by an operator at the rear end of the machine. The front end of shaft 34 and the upper end of shaft 30 are journaled in an angle bracket 35 mounted upon a plate 36 having an upwardly projecting flange 37 engaging said angle bracket 35 to prevent rotation of same, and with a depending flange 37ª engaging the rear end of the extension 8 of plate 2, so that said plate 36 shall be incapable of turning with the front truck.

In all heavy road grading machines with which I am familiar, the steering of the front truck is effected through the instrumentality of a long telescopic rod geared to the yoke, which rod is frequently bent when the front truck is turned to a greater extent than a one-quarter revolution in turning the machine. It also very frequently occurs that if said shaft is not bent, its sections become disengaged, and considerable time is lost in restoring the connection after the machine has been turned. One of the objects of this invention is to avoid this difficulty by providing for the transmission of power for steering purposes which cannot be disarranged or injured regardless of the amount of turning movement which is imparted to the front truck, the other object being to accommodate the withdrawal of the tongue without injury to the power transmitting gearing. It will be noted that when the shaft 34 is turned, power is transmitted through gear wheels 33 and 32, shaft 30, gear wheels 29, 28, the sectional telescopic shaft and the worm, to the worm wheel, which in turn, through shaft 20 turns cog wheel 19 and through the latter imparts movement to the yoke through engagement with the rack bar 18 thereof, the movement of the yoke being around the king bolt and hence effecting turning movement of the front truck. It will also be noticed that this operation can take place without interfering with up or down movement of the tongue because the yoke partakes of such movement and the slidable connection between the shaft sections 23 and 25 and the universal joint of said shaft accommodates this up and down movement. The tongue carries an inclined guard 38 for protecting the casting 12 by deflecting the same upwardly in the event an unyielding obstruction is encountered against which the casting might be forcibly drawn.

The tongue is shown in a position in longitudinal alinement with the center of the machine but in practice it only occupies such position when the machine is performing no work, as where the blade, not shown, is functioning, its tendency is to pull the machine toward one side. As a result the engine, not shown, but chained or otherwise coupled to the front end of the tongue in the customary manner, is traveling in a path at one side of the longitudinal center of the grader and the tongue therefore extends at an angle to the longitudinal center of the grader.

In the tilting movement of the axle and yoke, the axis of movement is in line with the tongue, hence the latter is not cramped and it never requires great force to steer the machine.

This case is a continuation in part only of applicant's allowed application for patent for road grader, filed August 15, 1917, Serial Number 186,409.

From the above description it will be apparent that I have produced a steering mechanism for road grading machines which embodies the features of advantage set forth as desirable, and which obviously can be modified in minor particulars without departing from the spirit and scope of the appended claims.

I claim:

1. In a road grading machine, a front truck having a yoke provided with a rack bar at its front side, a casting mounted slidably on the yoke, a vertical shaft journaled in the casting forward of the yoke and geared to said rack bar, means for holding the casting on the yoke, a tongue connected to the truck and extending slidably and rotatably through said casting, and means for operating said shaft to turn said yoke and the front truck.

2. In a road grading machine, a front truck having a yoke provided with a rack bar at its front side, a casting mounted slidably on the yoke, a vertical shaft journaled in the casting forward of the yoke and geared to said rack bar, means for holding the casting on the yoke, a tongue connected to the truck and extending slidably through said casting, a shaft journaled coaxially with the axis of turning movement of the truck, operating means connected to said shaft, and a suitably journaled extensible shaft provided with a universal joint and geared to the shaft journaled coaxially with the turning point of the truck and to the shaft journaled in said casting.

3. In a road grading machine, a front truck having a yoke provided with a rack bar at its front side, a casting mounted slidably on the yoke, a vertical shaft journaled in the casting forward of the yoke and geared to said rack bar, means for holding the casting on the yoke, a tongue connected to the truck and extending slidably through said casting, a shaft journaled coaxially with the axis of turning movement of the truck, operating means connected to said shaft, a suitably journaled extensible shaft geared at its rear end to the shaft journaled coaxially with the turning point of the truck, a worm on the front end of said shaft, and a worm wheel engaging said worm and secured on the shaft journaled in said casting.

4. In a grading machine, a tubular king bolt, a wheeled truck journaled thereon, a frame pivoted at its front end on said king bolt, a yoke connected to the front truck to turn therewith and capable of independent up and down movement and provided with a rack bar at its front side, a casting slidably mounted on the yoke, a vertical shaft journaled in the casting and provided with a cog wheel engaging said rack bar, a shaft extending through the king bolt, means for imparting movement to said shaft, a telescopic shaft suitably journaled and geared at its rear end to said king bolt shaft and at its front end to the shaft journaled in the casting, a draft plate mounted on the king bolt, and a tongue extending slidably and rotatably through said casting and pivoted for up and down movement to said draft plate.

5. In a grading machine, a tubular king bolt, a wheeled truck journaled thereon, a frame pivoted at its front end on said king bolt, a yoke connected to the front truck to turn therewith and capable of independent up and down movement and provided with a rack bar at its front side, a casting slidably mounted on the yoke, a vertical shaft journaled in the casting and provided with a cog wheel engaging said rack bar, a shaft extending through the king bolt, means for imparting movement to said shaft, a telescopic shaft suitably journaled and geared at its rear end to said king bolt shaft and at its front end to the shaft journaled in the casting, a draft plate mounted on the king bolt, a tongue extending slidably through said casting and pivoted for up and down movement to said draft plate, and a guard secured to the tongue forward of the casting and extending downwardly and rearwardly to a point below the latter.

6. In a grading machine, an axle, wheels journaled thereon, a lower truck member on the axle, a yoke pivoted for up and down movement to said truck member, an upper truck member, a vertical tubular king bolt journaled in the upper truck member and extending loosely through the lower truck member, a draft plate pivoted for lateral movement, to the king bolt, a tongue pivoted for up and down movement, to the draft plate, a casting slidable on the yoke and tongue, a shaft journaled in the casting and geared to the yoke, a vertical shaft journaled in the king bolt, a bracket fitting slidingly astride the axle and forming a journal for the lower end of the vertical shaft, a short shaft journaled in said bracket and geared to the lower end of the last-named vertical shaft, a telescopic shaft universally jointed to said short shaft and the shaft journaled in the casting, and geared to the last-named shaft, and means to turn the vertical shaft in the king bolt.

In testimony whereof I affix my signature.

JOHN R. KEY.